(12) United States Patent
MacTaggart

(10) Patent No.: US 7,182,355 B1
(45) Date of Patent: Feb. 27, 2007

(54) RECUMBENT TRICYCLE SAIL

(75) Inventor: Philip A. MacTaggart, 21 Hickory Hills, Geneseo, IL (US) 61254

(73) Assignee: Philip A. MacTaggart, Geneseo, IL (US)

( * ) Notice: Subject to any disclaimer, the term of this patent is extended or adjusted under 35 U.S.C. 154(b) by 0 days.

(21) Appl. No.: 11/329,903

(22) Filed: Jan. 11, 2006

(51) Int. Cl.
*B62B 15/00* (2006.01)

(52) U.S. Cl. ........................ 280/213; 280/282
(58) Field of Classification Search ............... 280/213, 280/282
See application file for complete search history.

(56) References Cited

U.S. PATENT DOCUMENTS

| | | | |
|---|---|---|---|
| 2,443,565 A * | 6/1948 | Land ..................... | 280/213 |
| 3,986,722 A | 10/1976 | Patterson | |
| 3,994,508 A | 11/1976 | Danner | |
| 4,332,395 A | 6/1982 | Zech | |
| 4,408,772 A * | 10/1983 | Hollwarth .................. | 280/1 |
| 4,441,728 A | 4/1984 | Schroeder | |
| 4,557,495 A | 12/1985 | Kindermann | |
| 4,634,136 A | 1/1987 | Alexander | |
| 4,735,429 A | 4/1988 | Beck | |
| D303,235 S | 9/1989 | Allen | |
| 5,873,588 A * | 2/1999 | Swetish .................. | 280/213 |
| 5,911,427 A * | 6/1999 | Lenz, Jr. .................. | 280/213 |
| 5,971,414 A | 10/1999 | Borzage | |
| 2003/0146615 A1 * | 8/2003 | Beckett .................. | 280/771 |

\* cited by examiner

*Primary Examiner*—Kevin Hurley
(74) *Attorney, Agent, or Firm*—Law Office of Jay R. Hamilton, PLC

(57) ABSTRACT

A land cycle for sailing on land comprising a recumbent tricycle with a first wheel and seat positioned aft of second and third wheels. A boom extending anteriorly of the front wheels engages a tricycle sprint to support a sailing system, which includes a vertically positioned mast engaged with the recumbent tricycle frame between the front wheels. A jib sail is positioned within a butterfly jib boom attached to the forestay and may be adjusted during use by the rider. The mast and combination of forestay, rear stay, mast sidestays and sprint sidestays cooperatively support attachment and use of said jib sail to said recumbent tricycle, thereby allowing a rider to apply wind force to stably motivate said land cycle. Further improvements disclosed and claimed include an independent rear brake, butterfly jib boom sleeve, a tubular jib spar, and a tubular forestay.

74 Claims, 14 Drawing Sheets

RECUMBENT TRICYCLE SAIL

FIELD OF THE INVENTION

The present invention relates to a method and apparatus for improving the performance of a recumbent tricycle by allowing the user to harness the motive force of wind.

CROSS REFERENCE TO RELATED APPLICATIONS (Not Applicable)
None

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

DETAILED DESCRIPTION—BRIEF DESCRIPTION OF THE DRAWINGS

DETAILED DESCRIPTION

Figure 1:
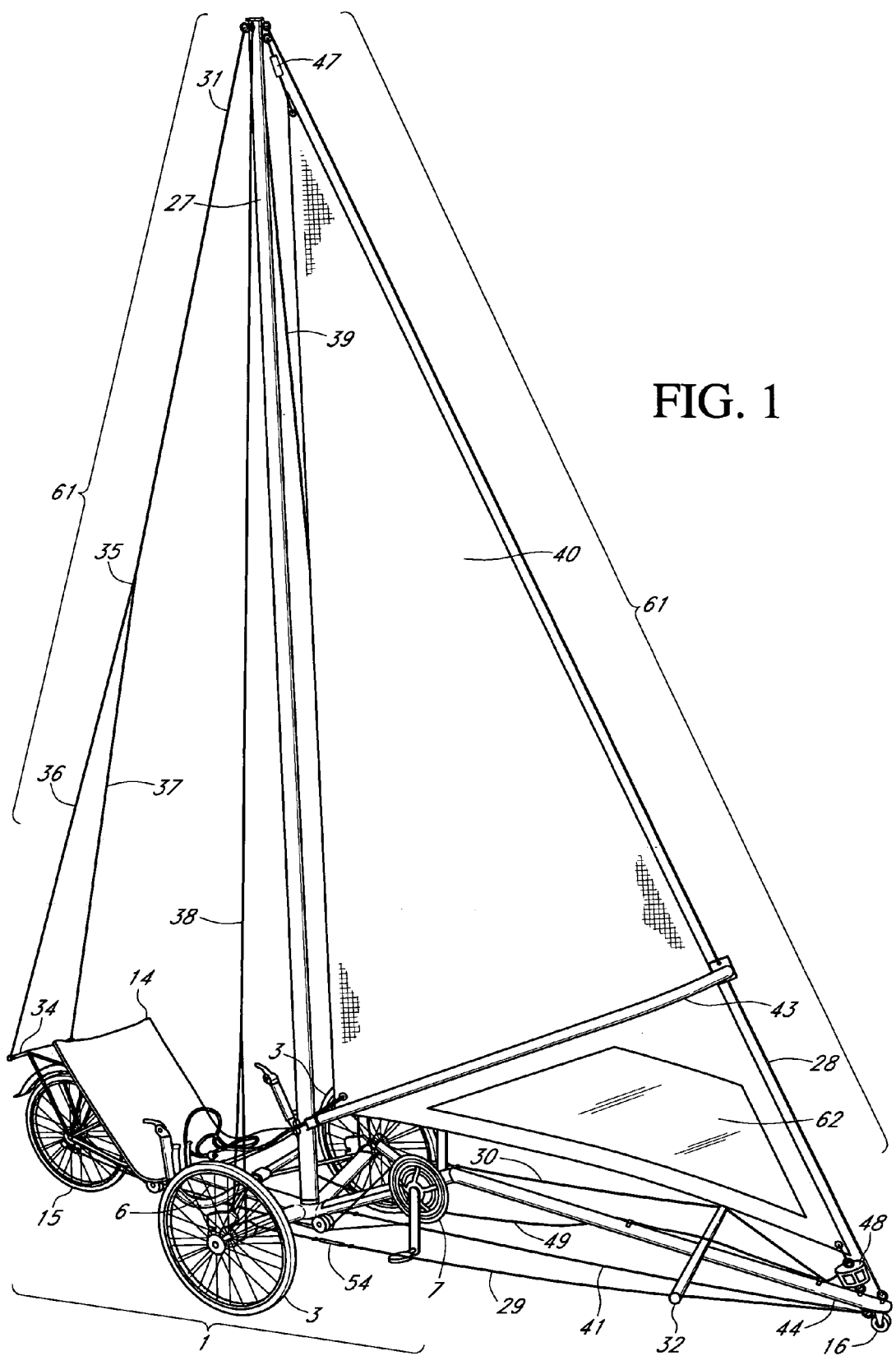
FIG. 1 is a perspective view of the sailing system mounted to a recumbent tricycle as described herein.

| Element Name | Element Number |
| --- | --- |
| recumbent tricycle | 1 |
| hub mount | 2 |
| front wheels | 3 |
| recumbent tricycle boom | 4 |

-continued

DETAILED DESCRIPTION

| Element Name | Element Number |
| --- | --- |
| outriggers | 5 |
| main frame | 6 |
| chain wheel | 7 |
| pedals | 8 |
| accessory mounting tube | 9 |
| chain | 10 |
| chain guide | 11 |
| right side brake handle | 12 |
| left side brake handle | 13 |
| seat | 14 |
| recumbent tricycle rear wheel | 15 |
| sprint caster | 16 |
| steering rods for front wheels | 17 |
| handle bars | 18 |
| rear wheel brake handle | 19 |
| rear wheel brake line | 20 |
| front derailleur shifter | 21 |
| rear derailleur shifter | 22 |
| rear wheel frame fork | 23 |
| rear wheel brake | 24 |
| rear wheel tricycle rack | 25 |
| mast mount | 26 |
| mast | 27 |
| forestay | 28 |
| starboard (right) sprint sidestay | 29 |
| port (left) sprint sidestay | 30 |
| back stay | 31 |
| sprint sidestay spreader | 32 |
| derailleur shifter line | 33 |
| stern stay bar | 34 |
| dogleg | 35 |
| rear starboard (right side) stay | 36 |
| rear port (left side) stay | 37 |
| starboard (right) mast sidestay | 38 |
| port (left) mast sidestay | 39 |
| jib (head) sail | 40 |
| tricycle sprint bottom stay | 41 |
| jib sheet | 42 |
| butterfly jib boom | 43 |
| tricycle sprint | 44 |
| butterfly jib boom bracket with cleat | 45 |
| jib sheet mast cleat | 46 |
| jib swivel | 47 |
| jib furler | 48 |
| jib sail furler line | 49 |
| luff line | 50 |
| butterfly jib boom apex | 51 |
| rigid jib spar | 52 |
| butterfly jib boom sleeve | 53 |
| turnbuckle | 54 |
| rigid forestay | 55 |
| securement pins | 56 |
| support strut | 57 |
| mast rigging subsystem | 58 |
| tricycle sprint rigging subsystem | 59 |
| sail deployment subsystem | 60 |
| sailing system | 61 |
| sail window | 62 |
| disc brake | 86 |
| disc brake caliper | 87 |

DETAILED DESCRIPTION

In overview, the apparatus and method as described herein teaches a sailing method and apparatus which allows a sail to be added to a recumbent tricycle. The inventor discloses and claims adding a frontally mounted sail to an existing recumbent tricycle through a combination of parts sold as a kit, the method of mounting and using said front sail in combination with a recumbent tricycle and a land sail cycle wherein the sail and recumbent tricycle are integral as well as any other means to accomplish the function of frontally mounted sails in combination with recumbent tricycles.

In the following description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

Recumbent tricycles (sometimes referred to simply as "trikes") are closely related to recumbent bicycles, although they have three wheels instead of two. Tricycles come in two varieties, the delta, with two rear wheels, and the tadpole, with two front wheels. Most recent high-performance tricycles are of the tadpole variety. Tricycles are very stable and are capable of turning sharply without leaning, producing lateral "g forces" similar to a sports car.

Figure 4:
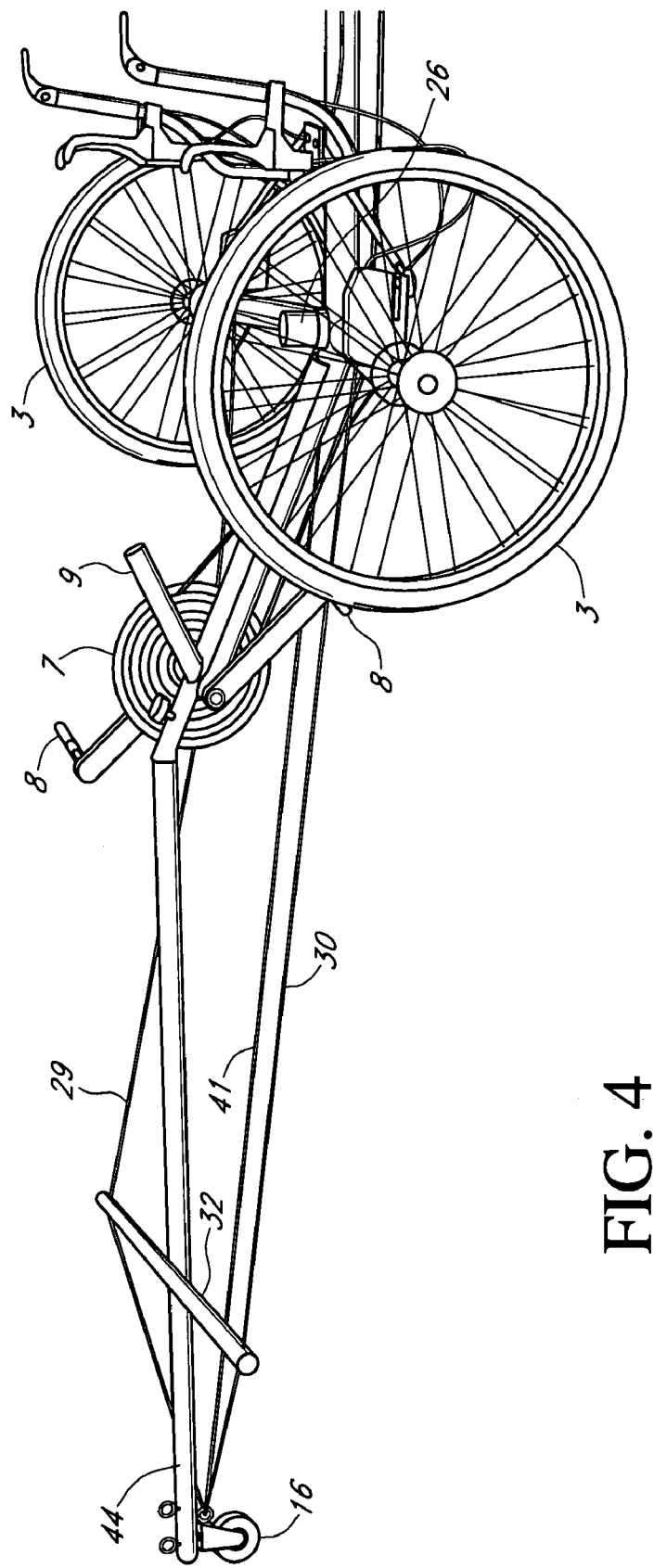
FIG. 4 is a left side view of the front portion of the sailing system described herein.
Figure 5:
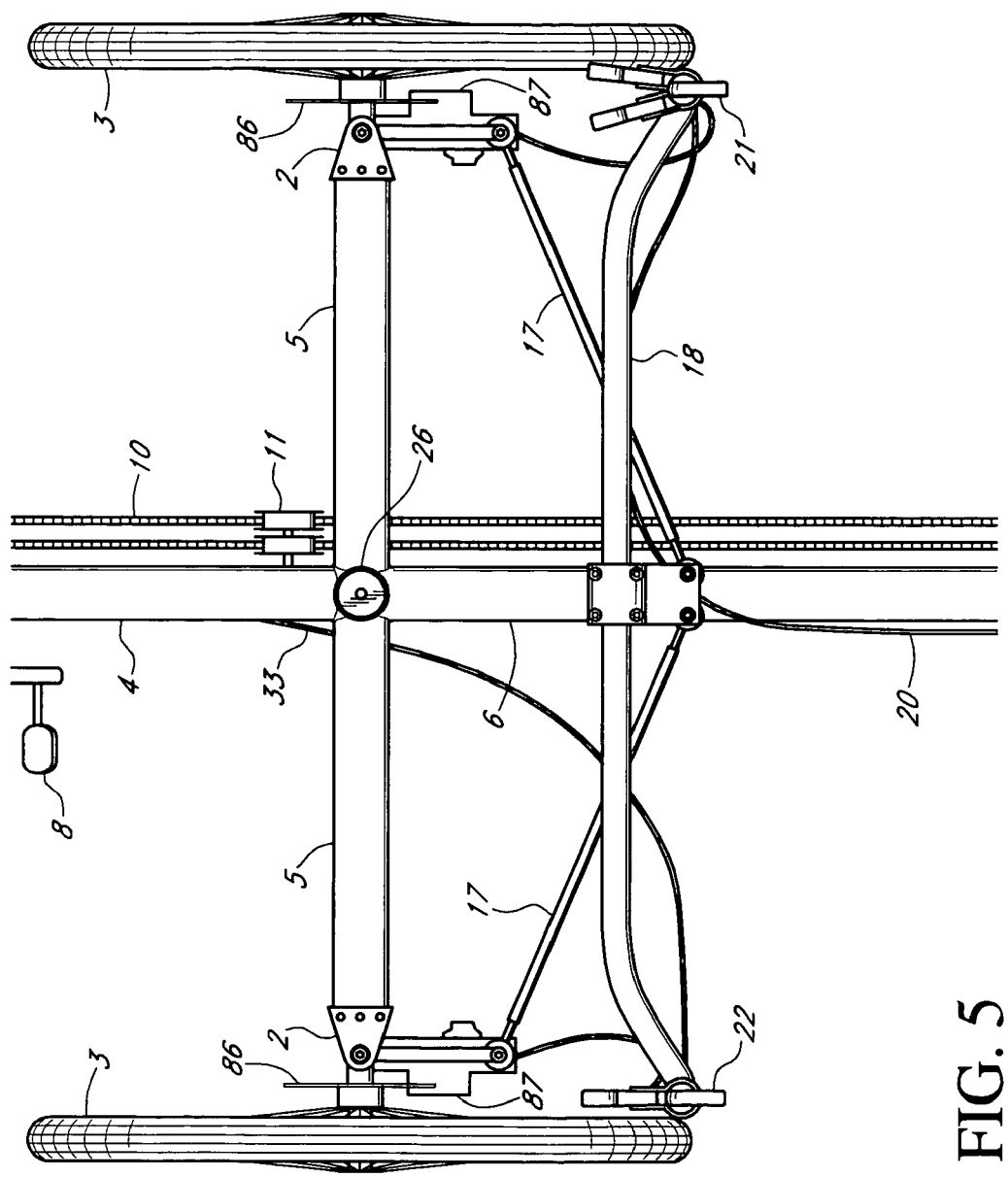
FIG. 5 is a top view of tricycle center section without the sailing system mounted as described herein.

FIG. 1 illustrates a perspective view of one embodiment of the sailing system 61 as mounted to a recumbent tricycle 1 and as shown in greater detail in FIGS. 3 and 6–10. FIGS. 2, 4 and 5 show the recumbent tricycle 1 with various sections of sailing system 61 removed to highlight certain elements and features discussed in greater detail herein. In overview, the sailing system 61 is composed of a mast rigging subsystem 58 (FIG. 1A), tricycle sprint rigging subsystem 59 (FIG. 1B) and sail deployment subsystem 60 (FIG. 1C). The mast rigging subsystem 58 includes mast 27 and various stays, as shown generally at FIG. 1A in complete lines and described in more detail herein, which are affixed between the recumbent tricycle 1 and the mast 27. A stay, as typically used in nautical applications, is defined as a wire, rope or cable. The mast rigging subsystem stays support the mast 27 and distribute forces generated by the jib sail 40 across the mast rigging subsystem 58 and recumbent tricycle 1 to allow for stable operation of the recumbent tricycle 1 during land sailing. The tricycle sprint rigging subsystem 59, as shown generally at FIG. 1B in complete lines, including tricycle sprint 44, sprint sidestays 29 and 30, jib boom 43 and luff line 50, along with other elements further described and defined herein, generally function to support the tricycle sprint 44 which supports the jib sail 40 as deployed. Sail deployment subsystem 60 shown at FIG. 1C in complete lines includes jib sail 40, jib sheet 42, butterfly jib boom 43, butterfly jib boom bracket with cleat 45, jib sheet mast cleat 46, jib swivel 47, jib furler 48, jib sail furler line 49 and luff line 50 along with other elements further described and defined herein, functioning to deploy jib sail 40 and cooperating with the other elements and subsystems of sailing system 61 and recumbent tricycle 1.

Jib sail 40, as shown may be made of any suitable strong lightweight material compatible with sailing which may or may not be transparent. Suitable jib sail 40 materials may include canvas, Aramid fibre laminates, (also known by the tradename Kevlar®) polyurethane films, Dacron®, Mylar or Pentex laminates, woven fabrics, monofilm and composites incorporating carbon or any combination thereof. As designed, the rider may operate the land sail vehicle with a jib sail having a material that is relatively opaque. Rider visibility may be increased by choosing a sail that is fully transparent or as shown in FIG. 1 having a transparent sail window 62.

FIG. 2 illustrates the lower front portion of the recumbent tricycle 1, as found in the prior art, with seat 14 removed to better show frame 6. The general shape of the tricycle frame 6 is that of an isosceles triangle with a rear wheel 15 at the first vertice of the triangle, proximate to rear wheel frame fork 23 and front wheels 3 at the second and third vertices of the triangle.

As shown in FIG. 5 the portions of the frame 6 extending out sideways from the center to the wheels are known as outriggers 5. Hub mounts 2 connect the outriggers 5 to the front wheels 3. Extending anteriorly out from front wheels 3 is boom 4 upon which chain wheel 7 has been mounted (FIG. 2). Pedals 8 turn chain wheel 7, which is connected through chain 10 to a sprocket attached to rear wheel 15. Turning chain wheel 7 allows motive force to be applied by a rider sitting on seat 14 attached to frame 6, positioned posterior to front wheels 3. A front derailleur shifter 21 allows changes in the front crankset gear ratio (not shown) through derailleur shifter line 33 (FIG. 5) and rear derailleur shifter 22 allows changes in rear cassette gear ratio (not shown) to further improve user selection of tricycle speeds. The tricycle 1 may also be slowed down or stopped using independent brakes (shown as disc brakes 86 and calipers 87 in FIG. 5) mounted at both left and right front wheels 3 and controlled by right and left brake handles 12, 13 (FIG. 2). Directional control and steering by the rider is delivered through handle bars 18 (FIG. 5) which are connected to front wheel steering rods 17. To allow the rider to manage the jib sail 40 with left hand and control the recumbent tricycle 1 with right hand, a rear brake 24 (FIG. 2) has been added to the rear wheel 15. The rear brake 24 also allows stable control of the recumbent tricycle 1 through a single brake controlled by the rear brake handle 19 (FIG. 6), thus freeing the rider's other hand to control the jib sail 40 through jib sail sheet 42. Most recumbent tricycles of the tadpole variety used with this sailing system do not come outfitted with a rear-wheel brake. This rear wheel brake disclosed and claimed herein provides even braking with one hand, freeing the rider's other hand to control the sail deployment subsystem 60 of the sailing system 61. The rear wheel brake 24 as shown is one means of stably braking the land sail vehicle using one hand, as recited in the claims.

FIG. 4 illustrates the lower support portion of the tricycle sprint rigging subsystem 59 as attached to the recumbent tricycle 1. As shown in FIG. 4, the tricycle sprint 44 has a first and second end. The first end of the tricycle sprint 44 is engaged with the boom 4 portion of the tricycle 1 between the front wheels 3 and is positioned anteriorly of the front wheels 3 (second and third vertices). The tricycle sprint 44 may be a hollow tapered tube made to be lightweight and strong. The preferred material is a carbon fiber composite, but other materials may be chosen such as plastic, steel and or aluminum. This element comprises the upper portion of the tricycle sprint rigging subsystem 59 shown generally at FIG. 1B and the lower portion of the sail deployment subsystem 60. It may be mounted to or simply engage boom 4 at the front axle.

Figure 2:
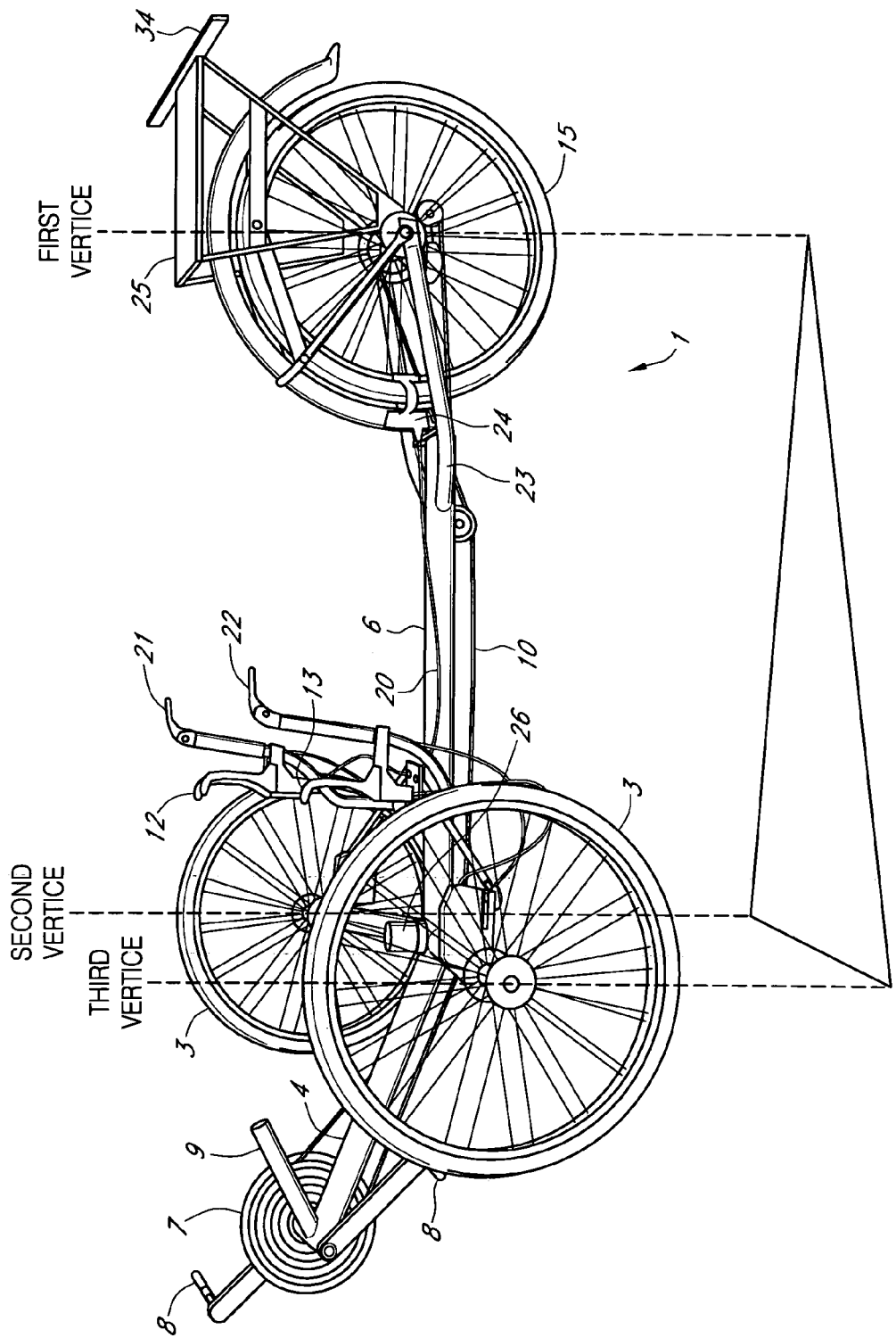
FIG. 2 is a side view of recumbent tricycle before mounting of the sailing system shown in FIG. 1.
Figure 3:
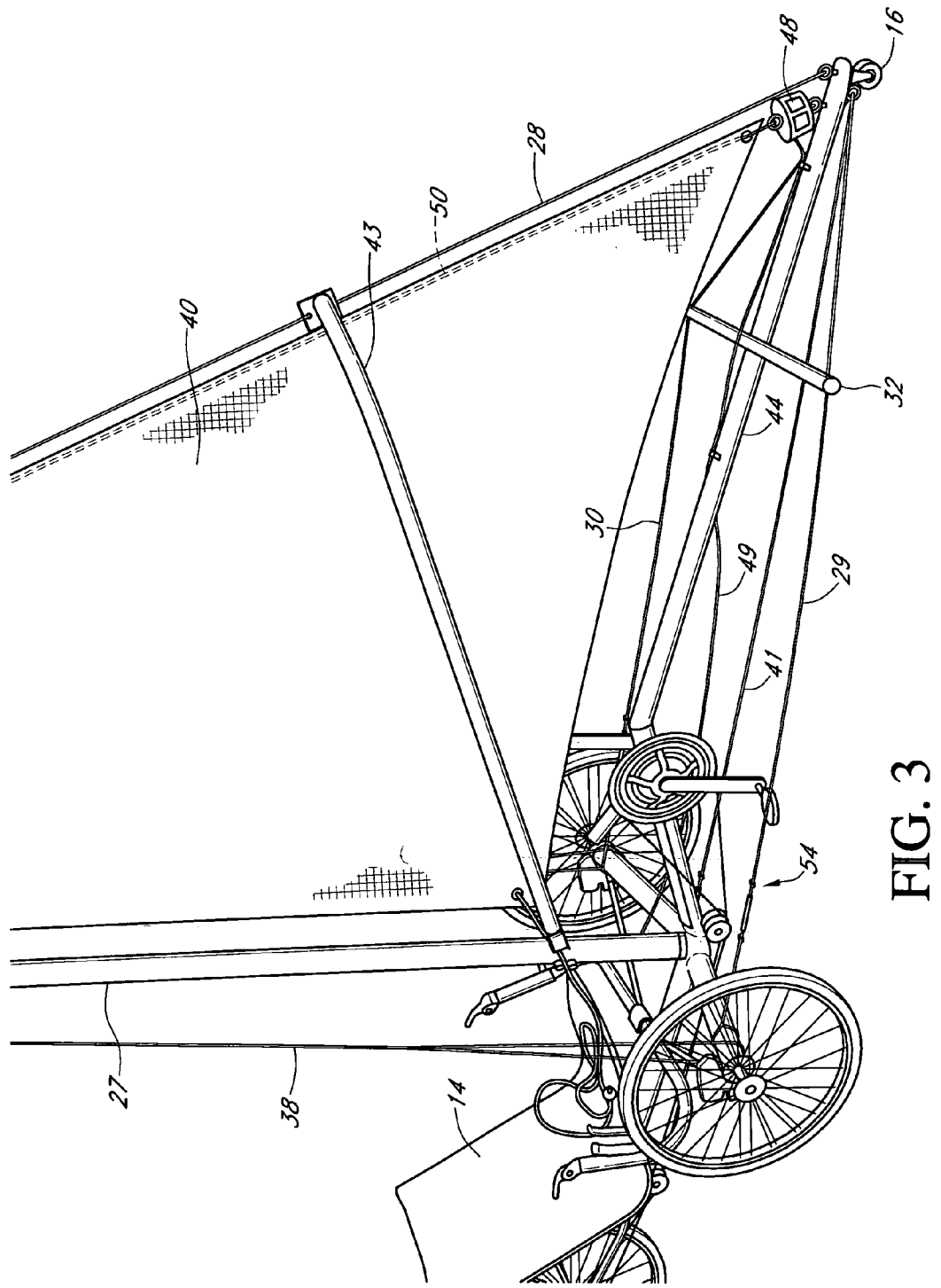
FIG. 3 is a right side view of the front portion of the sailing system.

As shown in FIG. 3, the front (or second end) of the tricycle sprint 44 is connected to the lower end of the forestay line 28 and the lower end of the luff line 50 through jib furler 48. As shown, actual connection hardware is an eye-bolt (no numeral assigned). Those skilled in the art will appreciate that other attachment means and methods including screws and brackets may be used without departing from the spirit and intent of present disclosure. In the embodiment shown, the first end of the tricycle sprint 44 detachably abuts boom 4 (FIG. 2). The various sprint sidestays (FIG. 3) shown provide the necessary tension to hold the tricycle sprint 44 in place against the recumbent tricycle boom 4.

With proper modification, the tricycle sprint 44 may also be attached to the boom 4 with securements such as bolts, brackets and screws. The tricycle sprint 44 may be also formed integral with the frame of the recumbent tricycle 1. The tricycle sprint 44 as shown is one means of providing support for the lower portion of sailing system 61, as recited in the claims. Additionally, as shown in FIG. 1, 3, 4, 6 and 7 the front (or second end) of tricycle sprint 44 incorporates a caster 16 or wheel means to protect the tricycle sprint 44 in the event of contact with the ground. The caster 16 as shown is one means of providing support for the tricycle sprint 44, as recited in the claims.

Figure 1A:
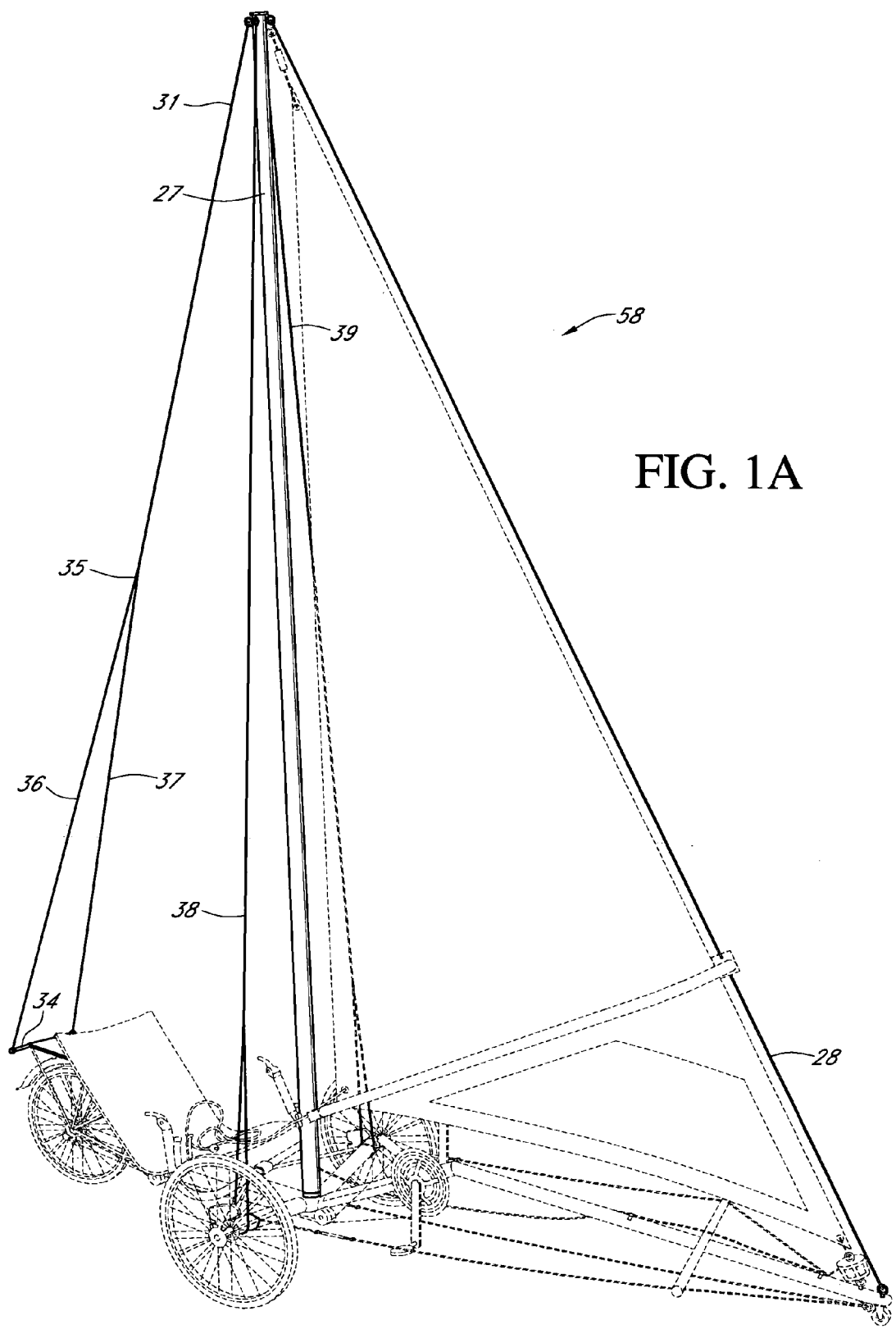
FIGS. 1A, 1B and 1C are generalized perspectives of the sailing subsystems comprising the sailing system described herein.
Figure 1B:
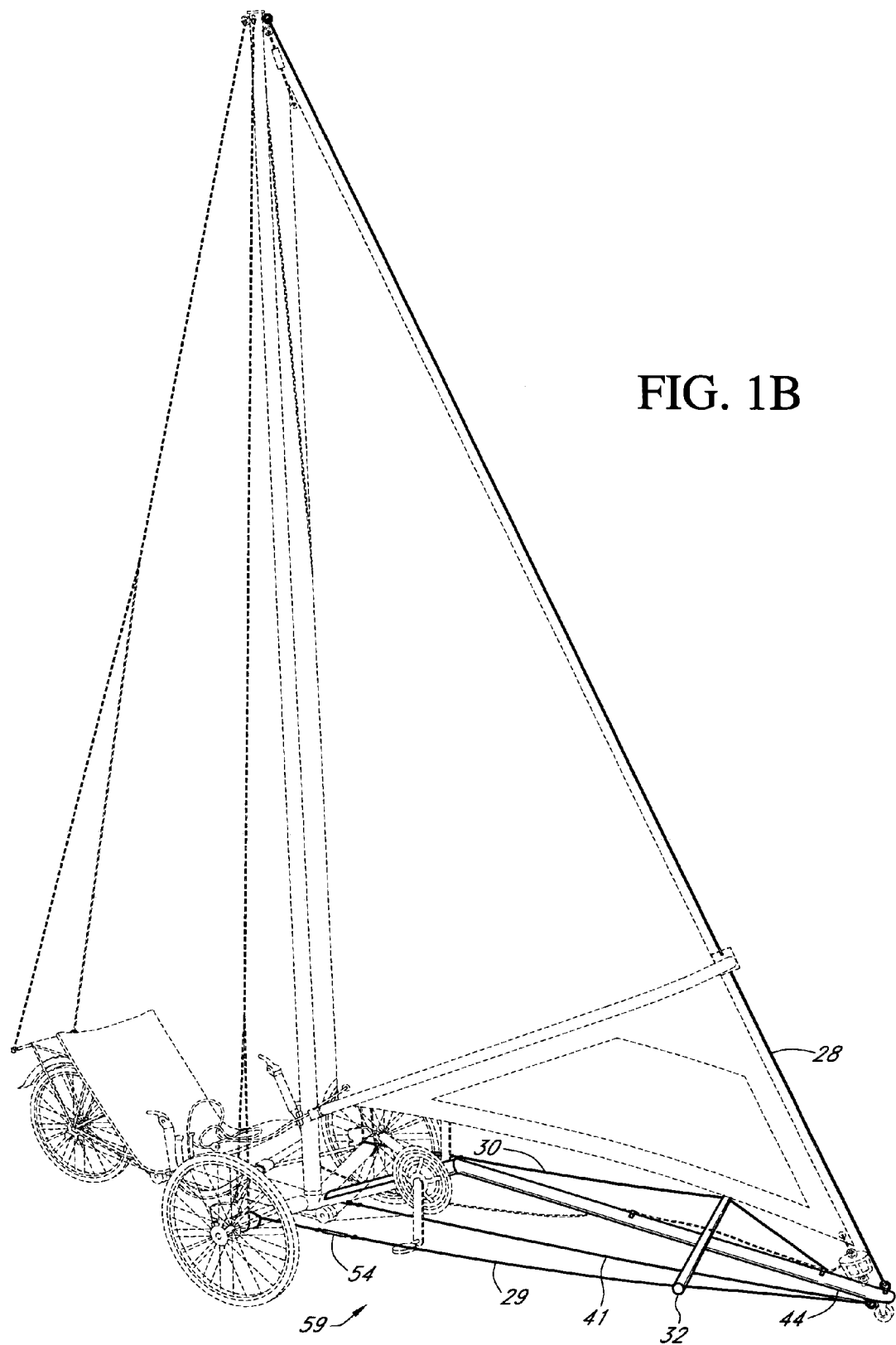
Figure 1C:
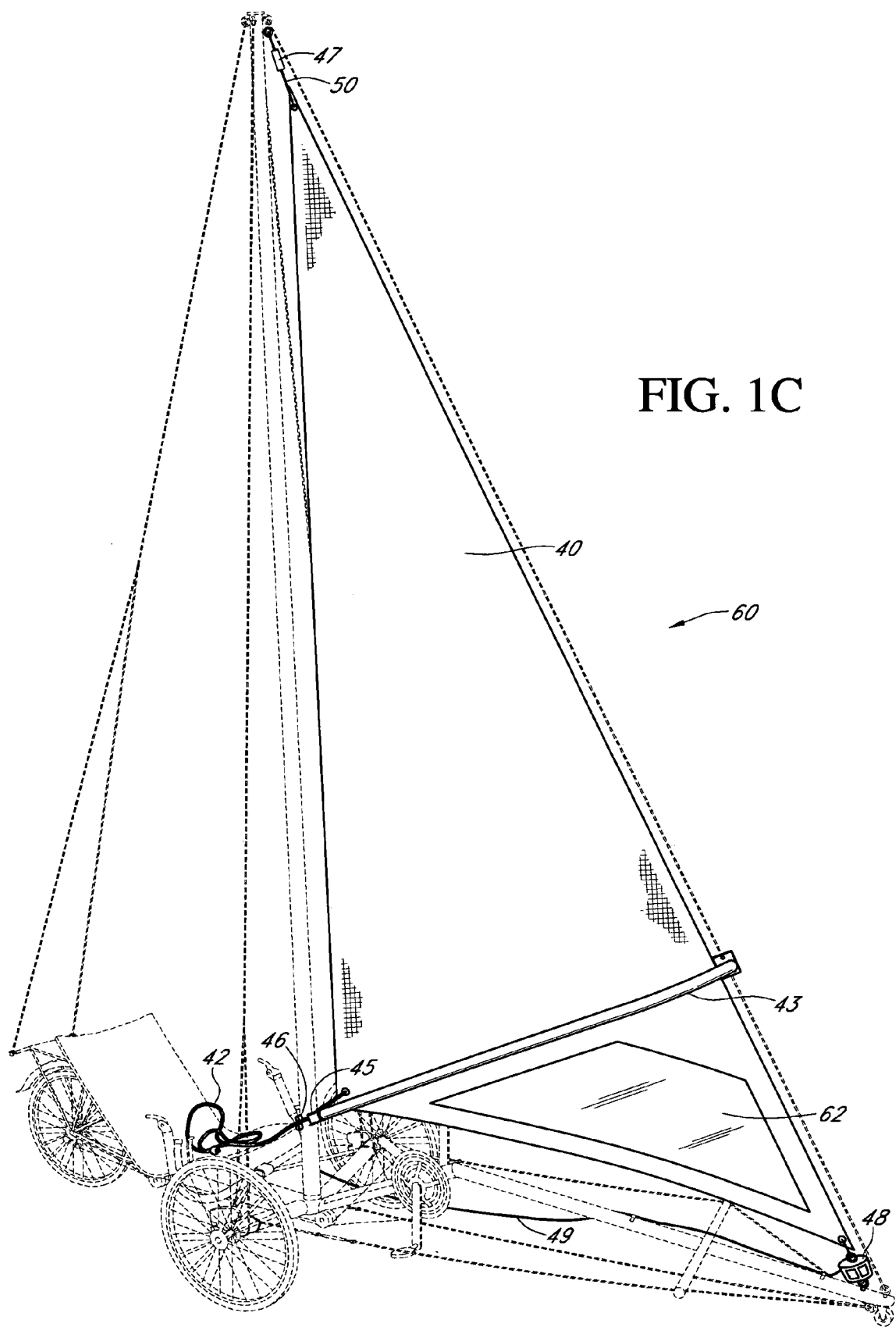
Figure 7:
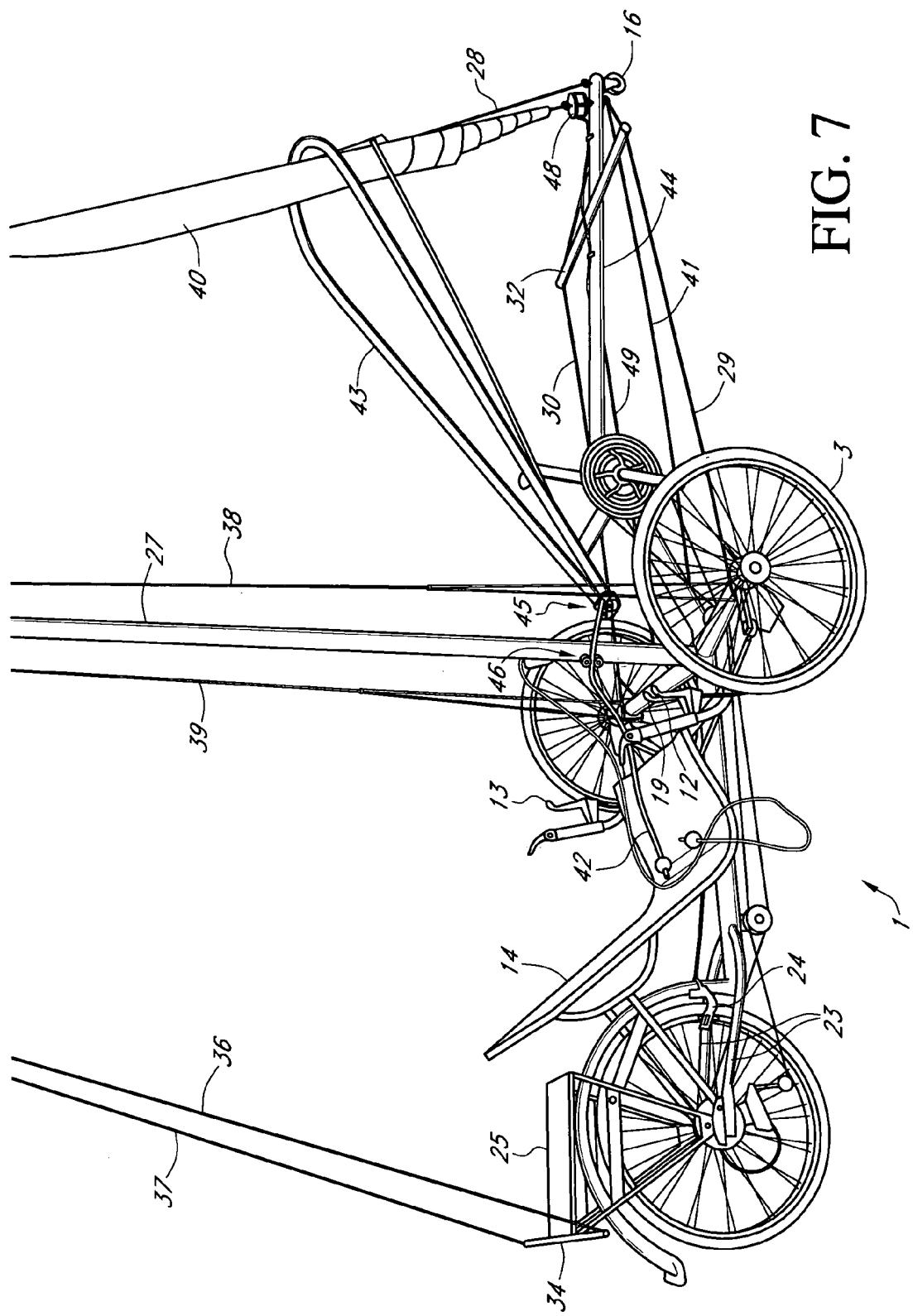
FIG. 7 is a right side perspective view of the sailing system mounted to a recumbent tricycle as described herein.

As shown in FIG. 1, 1A and FIG. 7, the mast rigging subsystem 58 has a vertically positioned mast 27 having a first and second end. The first end of the mast 27 mounts to the mast mount 26 (FIG. 5) for engagement with and mounting upon the tricycle frame 6 between the second and third wheels 3. For stability, the mast 27 is mounted in the center between the second and third wheels 3. The mast 27 is supported by a forestay 28 (FIG. 1) which is a component of both mast and tricycle rigging subsystems, 58 and 59, respectively. In the preferred embodiment, the mast mount 26 (FIG. 2) is not secured to the frame 6 of the recumbent tricycle 1 but only abuts against it. Those skilled in the arts will appreciate that mast mount 26 may also be secured to the frame 6 with bolts or brackets, or made integral to the frame 6. The mast mount 26 and mast 27 may also be fabricated in either one or two distinct pieces. The mast 27 and mast mount 26, as shown, are one means of vertically supporting the upper portion of sailing system 61, as recited in the claims.

The forestay 28 is attached to the top of the mast 27 at one end and at the front end of the tricycle sprint 44 at the other end (FIG. 1). A back stay 31 having a first end attached to the top end of the mast 27 and a second end attached to the tricycle frame 6 proximate the rear vertice. The forestay 28 is one means of supporting the anterior portion of the sailing system 61, as recited in the claims.

As shown in FIG. 1, the back stay 31 starts as one line but may be split into two lines using a dogleg 35 before attachment to the stern stay bar 34 which attaches to the rear wheel tricycle rack 25 (FIG. 7). In this configuration, the stern stay bar 34 maintains the position of the rear starboard stay 36 and rear port stay 37 creating or maintaining a functional space for the rider. The back stay 31 is one means of supporting the rear portion of the mast rigging subsystem 58, as recited in the claims. The rear wheel tricycle rack 25 provides one means of attachment of the rear portion of the mast rigging subsystem 59 to the recumbent tricycle 1, as recited in the claims.

As illustrated in FIG. 1 and FIG. 7, the starboard mast sidestay 38 has a first and second end. The first or upper end of the starboard mast sidestay 38 (FIG. 7) is connected to the top end of the mast 27. The second or lower end of the starboard mast sidestay 38 connects to the second vertice of the frame 6, which in this embodiment is the hub mount 2 of the tricycle 1 (FIG. 5). The starboard mast sidestay 38 (FIG. 7) directs sail system 61 support forces to the right side of tricycle 1 to increase stability. Also as illustrated in FIG. 1 and FIG. 7, the port mast sidestay 39 has a first and second end. The first or upper end of which is connected to the top end of the mast 27. The second or lower end of the port mast sidestay 39 connects to the third vertice of the frame 6, which in this embodiment is the hub mount 2 of the tricycle 1. The port mast sidestay 39 directs the mast rigging subsystem 58 support forces to the left side of tricycle 1 to increase stability. The starboard and port mast sidestays 38, 39 work together to prevent the mast 27 from moving sideways. (FIG. 1A) The starboard mast sidestay 38 and port mast sidestay 39 are one means of restricting the mast 27 from moving sideways, as recited in the claims.

As illustrated in FIGS. 3 and 7, a starboard (right) sprint sidestay 29 supports the right front of the tricycle sprint rigging subsystem 59. The starboard sprint sidestay 29 connects to the tricycle sprint 44 at the front and then runs through the stay spreader 32 to connect to wheel mount 2 (FIG. 5), proximate the second vertice of tricycle frame 6. Correspondingly, a port (left) sprint sidestay 30 (FIG. 3) supports the left front of the tricycle sprint rigging subsystem 59. The port sprint sidestay 30 connects to tricycle sprint 44 at the front and runs through the sprint stay spreader 32 to connect to wheel mount 2 (FIG. 5), proximate third vertice of tricycle frame 6. The combination of sprint sidestays stabilize the front of the tricycle sprint 44 and restrict sideways movement during sail operation. The starboard sprint sidestay 29 and port sprint sidestay 30 are one means of restricting the tricycle sprint 44 from moving sideways, as recited in the claims. Tricycle sprint bottom stay 41 as shown in FIGS. 1 and 4 attaches at the first end to the underside of recumbent tricycle boom 4 (FIG. 2). The first end of bottom stay 41 may also be connected to the tricycle frame proximate to the mast mount 26, as long as the tricycle sprint bottom stay 41 does not interfere with the chain wheel 7, pedals 8 or chain 10. The second end of tricycle sprint bottom stay 41 is attached to the front end of the tricycle sprint 44. Tricycle sprint bottom stay 41 provides support for the front portion of tricycle sprint rigging subsystem 59. The tricycle sprint bottom stay 41 prevents the tricycle sprint 44 from moving upwards when the jib sail 40 is active. The tricycle sprint bottom stay 41 is one means of restricting the tricycle sprint 44 from moving upwards, as recited in the claims.

Figure 8:
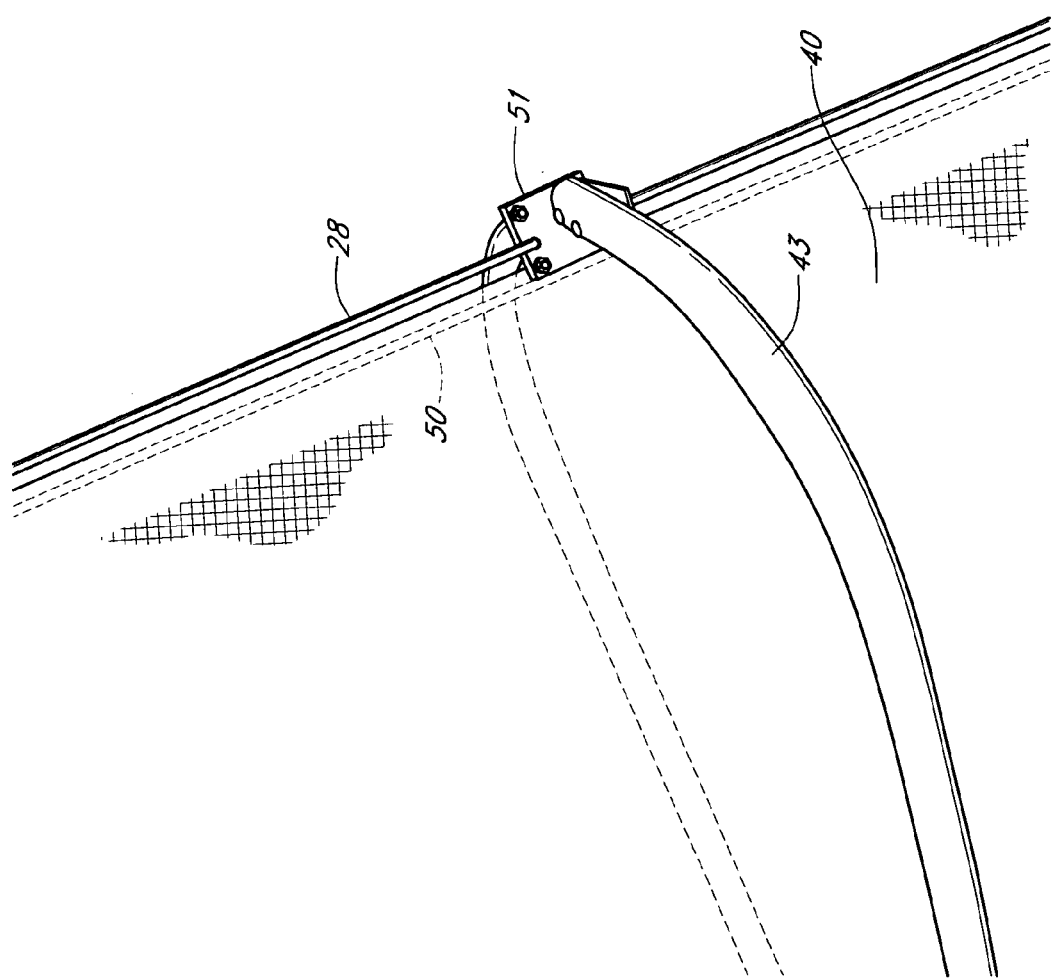
FIG. 8 is a detailed view of the jib boom of the sailing system described herein.

Luff line 50, as illustrated in FIG. 8, is a cable or rope running through the front inside portion of the jib sail 40 which is connected at the top to the jib sail swivel 47 (FIG. 1) and at the bottom to the jib furler 48, which is connected to tricycle sprint 44. The jib furler 48 rotates to furl and unfurl the jib sail 40 in combination with jib sail swivel 47. FIG. 7 illustrates the jib sail 40 furled. The jib sail 40 is connected at its upper end to mast 27 (FIG. 1) at jib sail swivel 47 and at its lower end connects to the anterior end of tricycle sprint 44 at jib sail furler 48. The jib sail 40 has a luff line 50 (FIG. 8) on the leading edge which supports it under load. Deployment of the jib sail 40 (FIG. 1) allows the recumbent tricycle 1 to capture the wind and be used as a land cycle sail vehicle. The jib sail 40 is one means of sail for the land cycle sail vehicle, as recited in the claims. The luff line 50 as shown in detail at FIG. 8 is one means of supporting the jib sail 40, as recited in the claims. Additionally, the combination of jib sail swivel 47 and jib sail furler 48 as shown in FIGS. 1 and 7 are one means of deploying the jib sail 40, as recited in the claims.

Figure 6:
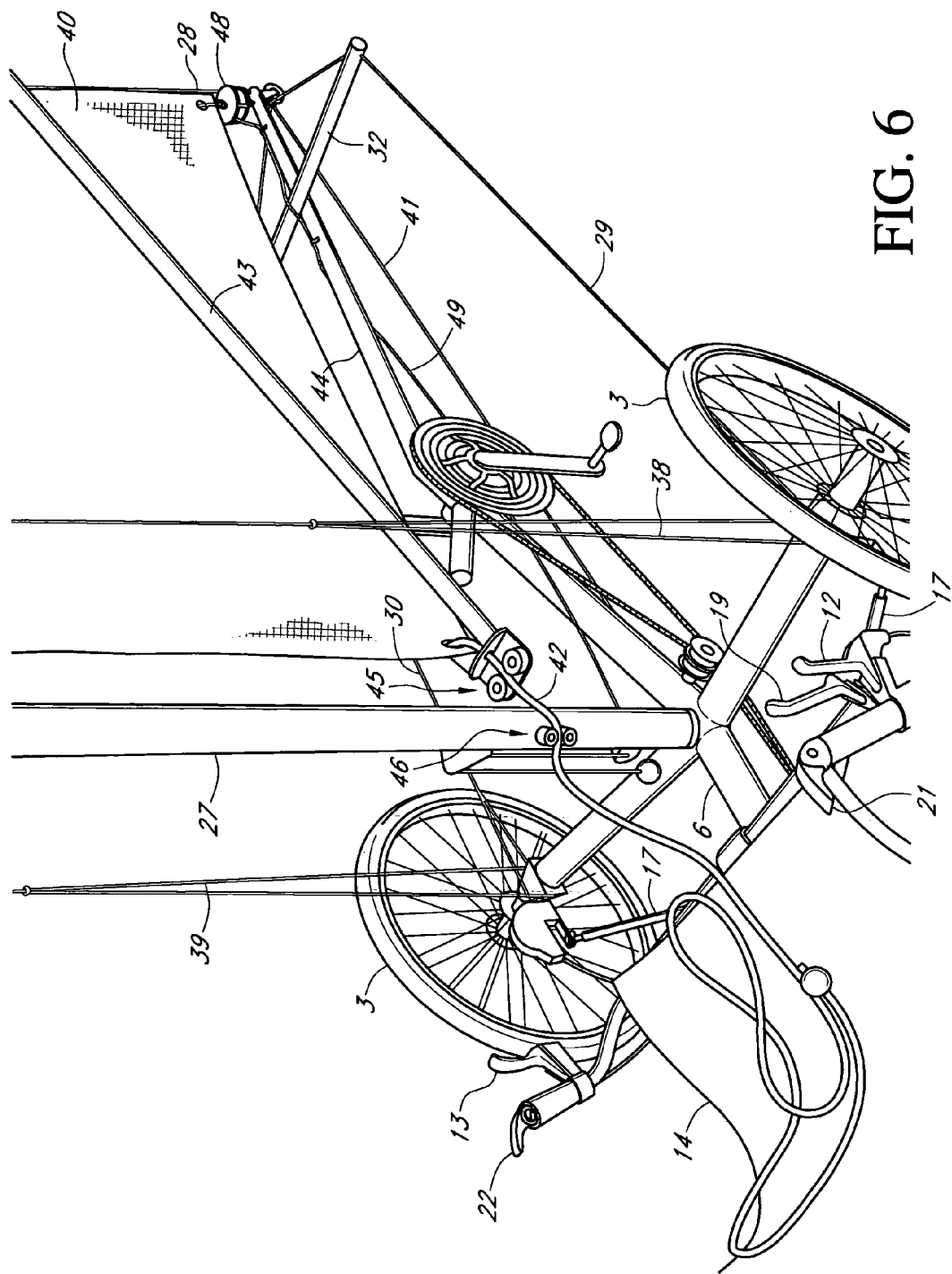
FIG. 6 is a detailed view of the jib boom in relation to the recumbent tricycle frame and mast as described herein.

FIGS. 3, 7 and 8 illustrate the butterfly jib boom 43 which bi-sects the lower portion of the jib sail 40. The front portion of the butterfly jib boom 43 is attached to the forestay 28. The leading edge of the jib sail 40 (sometimes referred to as the sail "luff") and the luff line 50, run inside the front portion of the butterfly jib boom 43, but are not attached to the forestay 28 nor to the butterfly jib boom 43, in order that the jib sail 40 may be furled freely. The butterfly jib boom 43 acts to hold jib sail 40 taunt when unfurled by butterfly jib boom bracket with cleat 45 (FIG. 6). The butterfly jib boom bracket with cleat 45 also acts to allow jib sail 40 to be partially or wholly furled, depending on wind conditions.

The butterfly jib boom 43 is one means of varying the amount of sail area exposed to the wind, as recited in the claims.

Figure 11:
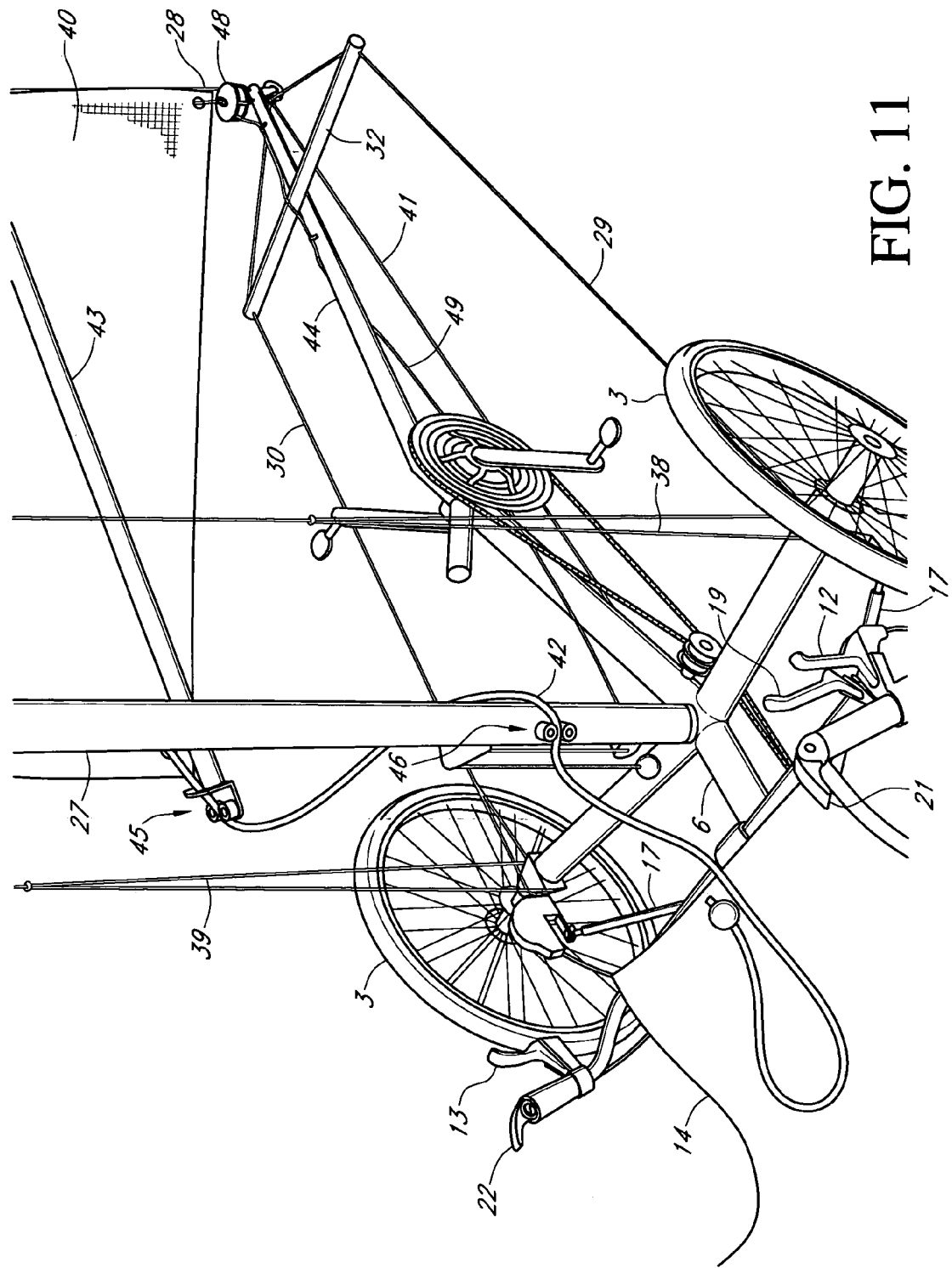
FIG. 11 is a perspective view illustrating the sail as deployed perpendicular to the tricycle.

The front point where the curves of the two tubes comprising the butterfly jib boom 43 meet is defined as the butterfly jib boom apex 51 (FIG. 8). The butterfly jib boom apex 51 is also the connection point to the forestay 28. The butterfly jib boom 43, as attached to forestay 28, permits the rear end of the butterfly jib boom 43, together with the jib sail 40, to swing to the port or starboard side of the recumbent tricycle 1, depending on the direction of the wind. FIG. 11 illustrates butterfly jib boom 43 and jib sail 40 swung out to the port side of the recumbent tricycle 1. This action of the butterfly jib boom 43 permits the jib sail 40 to be "self-tacking" when the operator changes the direction of the recumbent tricycle 1 relative to the wind. The butterfly jib boom 43 is one means of deploying the jib sail 40 to be self-tacking, as recited in the claims.

Figure 9:
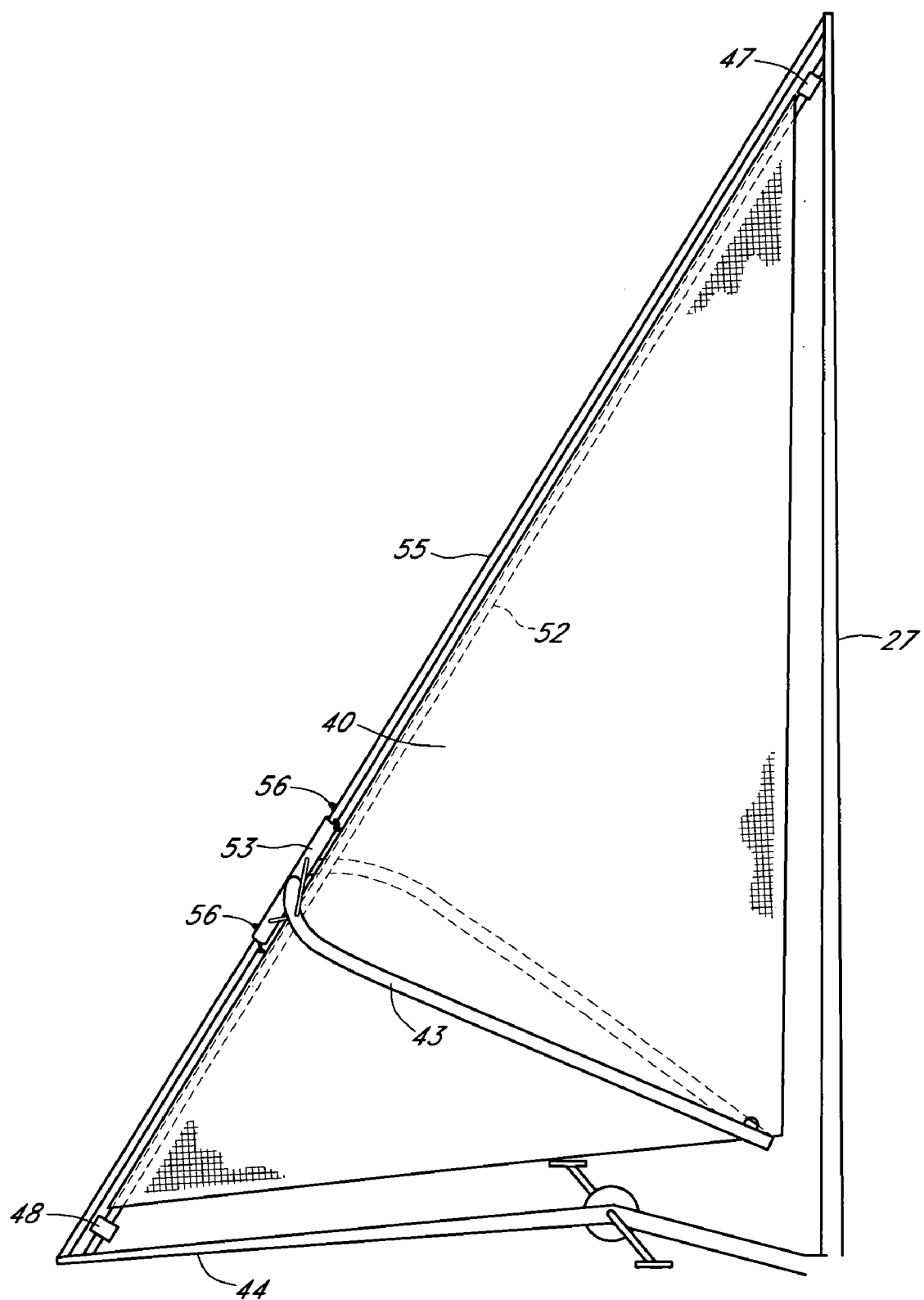
FIG. 9 is another embodiment of the sailing system described herein.

FIG. 9 illustrates further embodiments of the sailing system disclosed herein wherein line comprising forestay 28 has been replaced by rigid forestay 55. Preferred materials for the rigid forestay 55 are carbon fiber composites for lightweight, flexibility and rigidity. Alternative materials such as plastics and lightweight metals or combinations thereof may also be selected. As shown in FIG. 9 and more particularly in FIG. 10, the apex of the butterfly jib boom 51 has been further modified with the addition of a butterfly jib boom sleeve 53. This modification improves upon the butterfly jib boom 43. The butterfly jib boom sleeve 53 fits over the rigid forestay 55 and allows the butterfly jib boom 43 to swing from side to side without permitting the opposite end of the butterfly jib boom 43 to move up or down. The support struts 57 are one means to further strengthen the connection of the butterfly jib boom sleeve 53 to the butterfly jib boom 43. Securement pins 56 restrict movement of the butterfly jib boom sleeve 53 along the tubular forestay 55. To reduce the weight of the rigid forestay 55, it may be tubular or hollow.

Figure 10:
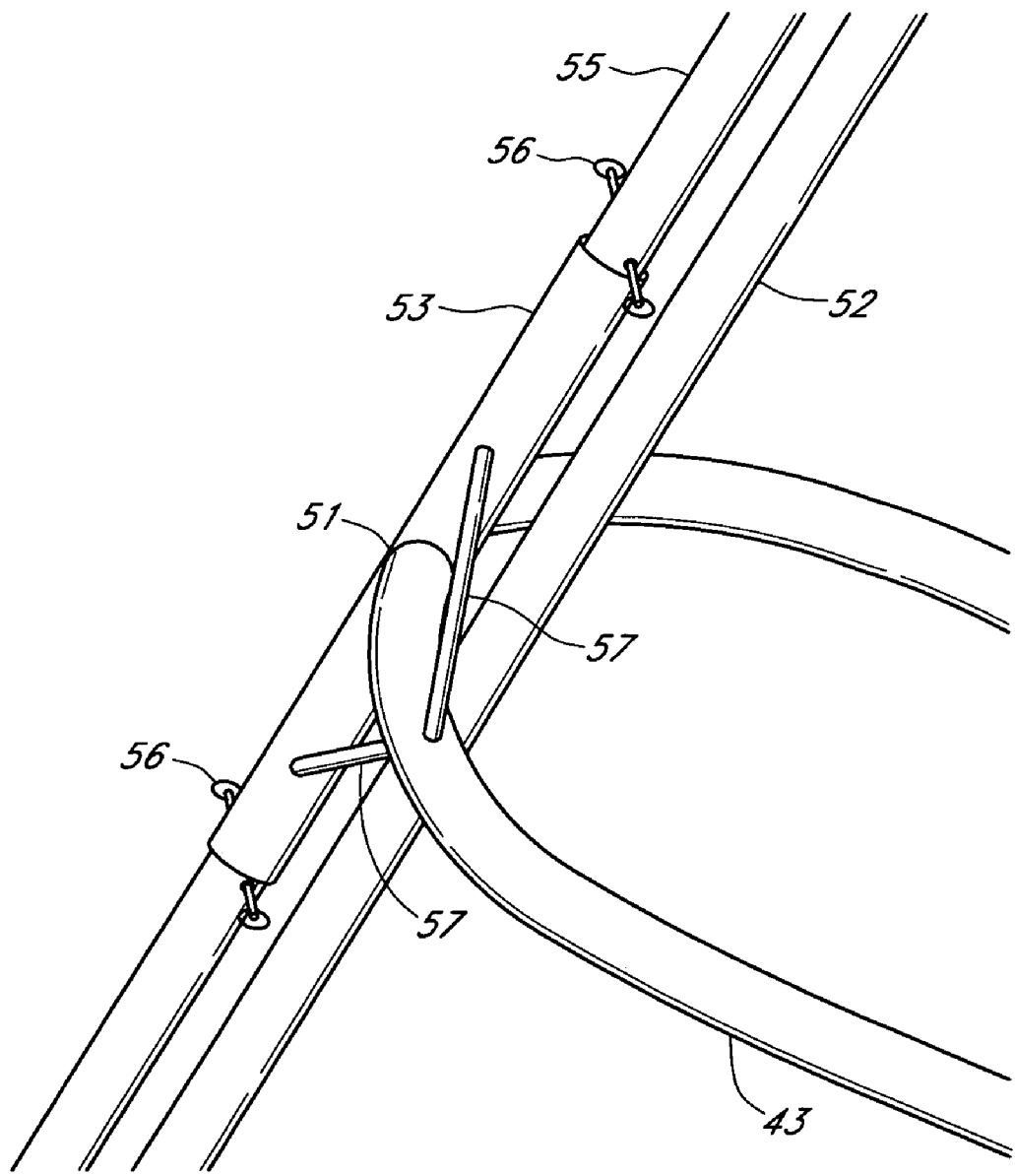
FIG. 10 is a detailed view of another embodiment of the sailing system jib boom described herein.

As shown in FIG. 10, the addition of the butterfly jib boom sleeve 53 to the butterfly jib boom 43 and the use of a rigid tube as a forestay, inside the butterfly jib boom sleeve 53, prevents the back end of the butterfly jib boom 43 from moving up or down while sailing, which would otherwise cause slack or bending in the sail surface area. This improvement makes the self-tacking jib sail 40 maintain maximum surface area exposed to the wind at all times increasing the efficiency of the jib sail 40. The butterfly jib boom sleeve 53 in combination with butterfly jib boom 43 is one means of allowing the rear end of the butterfly jib boom 43 to swing laterally while maintaining maximum surface area exposed to the wind at all times, as recited in the claims. Securement pins 56 are one means of restricting movement of the butterfly jib boom sleeve 53 along the tubular forestay 55, as recited in the claims. FIG. 11 illustrates the position of the butterfly jib boom 43 as jib sail 40 is swung out away from the tricycle 1 during sail deployment.

FIGS. 9 and 10 also illustrate another embodiment of the sailing system disclosed herein. In this embodiment, the luff line 50 has also been replaced with a rigid jib spar 52, also capable of minimal flex and having enhanced rigidity, similar to the rigid forestay 55. This rigid jib spar 52 does not bow out or bend as does luff line 50. During sailing, rigid jib spar 52 increases overall efficiency of jib sail 40 during operation by maintaining maximum exposure of "luff" to the wind, by not bending.

The preferred materials for the rigid jib spar 52 are carbon fiber composites for lightweight flexibility and rigidity. Alternative materials such as plastics and lightweight metals or combinations thereof may also be selected. The rigid jib spar 52 may also be tubular or hollow. The rigid forestay 55 and rigid jib spar 52 may be implemented together as shown in FIGS. 9 and 10 or independently. Although rigid forestay 55 and rigid jib spar 52 as shown in FIGS. 9 and 10 are circular, non-circular shapes may also be chosen. The rigid forestay 55 is one means of increasing the rigidity of both the mast rigging subsystem 59 and sail deployment subsystem 60, as recited in the claims. The rigid jib spar 52 is one means of increasing the rigidity of the sailing system 61 to enhance sail performance, as recited in the claims.

While the invention has been described with reference to preferred embodiments, variations or modifications would be apparent to one of ordinary skill in the art without departing from the scope of the invention. Consequently, the appended claims should not be limited to their literal terms, but should be broadly construed in accordance with the scope of the invention, as described above.

What is claimed to be new and desired to be protected by Letters Patent is set forth in the appended claims:

1. A land cycle for sailing on land comprising:
    a. a recumbent tricycle, wherein said recumbent tricycle includes:
        i. a frame having a shape approximating a triangle, having first, second and third vertices;
        ii. a first wheel having a sprocket, said first wheel connected to said frame and positioned at said first vertex of said frame;
        iii. a second and third wheel attached to said second and third vertices of said frame, said second wheel and said third wheel opposedly aligned, and wherein said first wheel is positioned behind said second and third wheels;
        iv. a seat for supporting a rider, said seat positioned behind said second and third wheels and attached to said frame;
        v. a boom extending anteriorly of said second and third wheels;
        vi. a chain wheel supportably attached to said boom and positioned anteriorly of said seat, said chain wheel connecting a set of pedals for input of motive force by said rider to a chain driving said first wheel sprocket;
        vii. a braking system acting on said second and third wheels and controllable by said rider;
        viii. a steering system acting on said second and third wheels and controllable by said rider;
    b. a tricycle sprint having a first and second end, said first end of said tricycle sprint engaged with said frame between said second and third wheels, said second end of said tricycle sprint positioned anteriorly of second and third wheels;
    c. a vertically positioned mast having a first and second end, said first end of said mast engaged with said frame between said second and third wheels;
    d. a forestay having a first and second end, said first end of said forestay attached to said second end of said mast and said second end of said forestay attached to said second end of said tricycle sprint;
    e. a back stay having a first and second end, said first end of said back stay attached to said second end of said mast and said second end of said back stay attached to said frame, proximate said first vertex;
    f. a starboard mast sidestay having a first and second end, said first end of said starboard mast sidestay attached to said second end of said mast and said second end of said starboard mast sidestay attached to said frame at said second vertex;

g. a port mast sidestay having a first and second end, said first end of said port mast sidestay attached to said second end of said mast and said second end of said port mast sidestay attached to said frame at said third vertex;

h. a starboard sprint sidestay having a first and second end, said first end of said starboard sprint sidestay attached to said second end of said tricycle sprint and said second end of said starboard sprint sidestay attached to said frame proximate said second vertex;

i. a port sprint sidestay having a first and second end, said first end of said port sprint sidestay attached to said second end of said tricycle sprint and said second end of said port sprint sidestay attached to said frame proximate said third vertex;

j. a tricycle sprint bottom stay having a first and second end, said first end of said tricycle sprint bottom stay attached to said second end of said tricycle sprint and said second end of said tricycle sprint bottom stay attached to said frame proximate to said mast interface with said frame;

k. a luff line having a first and second end, said first end of said luff line connected to said second end of said mast and said second end of said luff line connected to a furler positioned at said second end of said tricycle sprint;

l. a butterfly jib boom having a first and second end, said second end of said butterfly jib boom attached to said forestay;

m. a jib sail having a triangular shape and swivelly attached along its first portion by said luff line, said jib sail positioned within said butterfly jib boom, said jib sail adjusted by attachment of said top portion of said jib sail to said mast and wherein said forestay, rear stay, mast sidestays and sprint stays cooperatively support attachment and use of said jib sail to said recumbent tricycle thereby allowing a rider to apply wind force to stably motivate said land cycle.

2. A land cycle as described in claim 1 having a sprint stay spreader with first and second ends positioned transverse of said tricycle sprint and wherein said first end of said sprint stay spreader cooperates with said port sprint sidestay and second end of said sprint stay spreader cooperates with said starboard sprint sidestay to maintain a pre-determined distance between said port sprint sidestay and said starboard sprint sidestay.

3. A land cycle as described in claim 2 further comprising:

a. A back stay having a first and second section wherein said first section of said back stay is a single line having an end which is attached to said second end of said mast and said second section of said back stay is comprised of a first and second line wherein each of said first and second lines has an end for attachment;

b. A stern stay bar having a first and second opposing ends is mounted to said recumbent tricycle frame in a position posterior of said first wheel and transverse to said first wheel and wherein said stern stay bar has a pre-determined length selected to maintain a pre-determined distance between said first and second lines of said second section of said back stay and wherein the ends of said first and second lines of said second section of said back stay are attached to said first and seconds ends of stern stay bar.

4. A land cycle as described in claim 1 having a braking system acting upon said first wheel, independent of said braking system acting upon said second and third wheels.

5. A land cycle as described in claim 1 wherein the tension of said stays may be mechanically adjusted.

6. A land cycle as described in claim 3 having a braking system acting upon said first wheel, independent of said braking system acting upon said second and third wheels.

7. A land cycle as described in claim 1 wherein said tricycle sprint is comprised of a material selected from the group consisting of aluminum, steel, carbon fiber composite, plastic and combinations thereof.

8. A land cycle as described in claim 3 wherein said forestay is tubular and comprised of a material selected from the group consisting of aluminum, steel, carbon fiber composite, plastic and combinations thereof.

9. A land cycle as described in claim 6 wherein said forestay is tubular and comprised of a material selected from the group consisting of aluminum, steel, carbon fiber composite, plastic and combinations thereof.

10. A land cycle as described in claim 7 wherein said forestay is tubular and comprised of a material selected from the group consisting of aluminum, steel, carbon fiber composite, plastic and combinations thereof.

11. A land cycle as described in claim 8 wherein said second end of said butterfly jib boom is compromised of a sleeve positioned at the apex of the butterfly jib boom, said sleeve allowing insertion of said forestay, so said butterfly jib boom may rotate upon said forestay.

12. A land cycle as described in claim 8 wherein said luff line is comprised of a material selected from the group consisting of aluminum, steel, carbon fiber composite, plastic and combinations thereof.

13. A land cycle as described in claim 9 wherein said luff line is comprised of a material selected from the group consisting of aluminum, steel, carbon fiber composite, plastic and combinations thereof.

14. A land cycle as described in claim 10 wherein said luff line is comprised of a material selected from the group consisting of aluminum, steel, carbon fiber composite, plastic and combinations thereof.

15. A land cycle as described in claim 11 wherein said luff line is comprised of a material selected from the group consisting of aluminum, steel, carbon fiber composite, plastic and combinations thereof.

16. A land cycle as described in claim 15 wherein said luff line has a circular shape.

17. A land cycle as described in claim 11 wherein said forestay and sleeve have a tubular circular shape.

18. A land cycle as described in claim 1, wherein said jib sail is transparent.

19. A land cycle as described in claim 1, wherein said jib sail has a transparent window.

20. A land cycle as described in claim 18, wherein said jib sail is self-tacking.

21. A land cycle as described in claim 19, wherein said jib sail is self-tacking.

22. A land cycle as described in claim 3, wherein said jib sail is transparent.

23. A land cycle as described in claim 3, wherein said jib sail has a transparent window.

24. A land cycle as described in claim 22, wherein said jib sail is self-tacking.

25. A land cycle as described in claim 23, wherein said jib sail is self-tacking.

26. A land cycle as described in claim 4, wherein said jib sail is transparent.

27. A land cycle as described in claim 4, wherein said jib sail has a transparent window.

28. A land cycle as described in claim 26, wherein said jib sail is self-tacking.

29. A land cycle as described in claim 27, wherein said jib sail is self-tacking.

30. A land cycle as described in claim 7, wherein said jib sail is transparent.

31. A land cycle as described in claim 7, wherein said jib sail has a transparent window.

32. A land cycle as described in claim 11, wherein said jib sail is transparent.

33. A land cycle as described in claim 11, wherein said jib sail has a transparent window.

34. A land cycle as described in claim 6, wherein said tricycle sprint has a caster mounted for ground contact.

35. A land cycle as described in claim 26, wherein said tricycle sprint has a caster mounted for ground contact.

36. A land cycle as described in claim 27, wherein said tricycle sprint has a caster mounted for ground contact.

37. An apparatus for sailing on land comprising:
   a. a recumbent tricycle, wherein said recumbent tricycle includes:
      i. a frame having a shape approximating a triangle, having first, second and third vertices;
      ii. a first wheel having a sprocket, said first wheel connected to said frame and positioned at said first vertex of said frame;
      iii. a second and third wheel attached to said second and third vertices of said frame, said second wheel and said third wheel opposedly aligned, and wherein said first wheel is centrally positioned behind said second and third wheels;
      iv. a seat for supporting a rider, said seat positioned behind said second and third wheels and attached to said frame;
      v. a boom extending anteriorly of said second and third wheels;
      vi. a chain wheel supportably attached to said boom and positioned anteriorly of said seat, said chain wheel connecting to a set of pedals for input of motive force by said rider to a chain driving said first wheel sprocket;
      vii. a braking system acting on said second and third wheels and controllable by said rider;
      viii. a steering system acting on said second and third wheels and controllable by said rider;
   b. A sail deployment means attached to said recumbent tricycle;
   c. A sail means connected to said sail deployment means;
   d. A sail support means, said sail support means attached between said recumbent tricycle and sail deployment means to distribute forces generated by said sail across said recumbent tricycle allowing stable operation of said recumbent tricycle during land sailing.

38. An apparatus for sailing on land as described in claim 37, wherein said sail support means includes a vertical support means mounted to said recumbent tricycle to support the upper portion of said sail support means.

39. An apparatus for sailing on land as described in claim 38, wherein said sail support means includes a tricycle sprint mounted to said recumbent tricycle to support the lower portion of said sail deployment means.

40. An apparatus for sailing on land as described in claim 39, wherein said sail support means includes means to restrict sideways movement of said vertical support means.

41. An apparatus for sailing on land as described in claim 40, wherein said sail support means includes means to restrict sideways movement of said tricycle sprint means.

42. An apparatus for sailing on land as described in claim 41, wherein said sail support means is rigid.

43. An apparatus for sailing on land as described in claim 42, wherein the sail means is transparent.

44. An apparatus for sailing on land as described in claim 40, wherein sail deployment means allows said sail means to be self-tacking.

45. An apparatus for sailing on land as described in claim 41, wherein said sail deployment means allows said sail means to be self-tacking.

46. An apparatus for sailing on land as described in claim 42, wherein said sail deployment means allows said sail means to be self-tacking.

47. An apparatus for sailing on land as described in claim 46, wherein said sail means is transparent.

48. An apparatus for sailing on land as described in claim 41, wherein said land sail vehicle has a braking system acting on said first wheel.

49. An apparatus for sailing on land as described in claim 42, wherein said land sail vehicle has a braking system acting on said first wheel.

50. An apparatus for sailing on land as described in claim 46, wherein said land sail vehicle has a braking system acting on said first wheel.

51. An apparatus for sailing on land as described in claim 46, wherein said sail means is transparent.

52. An apparatus for sailing on land as described in claim 50, wherein said sail means is transparent.

53. An apparatus for sailing on land as described in claim 24, wherein said sail deployment means allows said sail means to be self-tacking.

54. An apparatus for sailing on land as described in claim 37, wherein said sail means may be furled and unfurled.

55. An apparatus for sailing on land as described in claim 52, wherein said sail means may be furled and unfurled.

56. An apparatus for sailing on land as described in claim 42, wherein said sail deployment means and said sail support means are integral to said recumbent tricycle.

57. An apparatus for sailing on land as described in claim 48, wherein said sail deployment means and said sail support means are integral to said recumbent tricycle.

58. An apparatus for sailing on land as described in claim 50, wherein said sail deployment means and said sail support means are integral to said recumbent tricycle.

59. An apparatus for sailing on land as described in claim 52, wherein said sail deployment means and said sail support means are integral to said recumbent tricycle.

60. A combination of cooperating elements offered as a kit for converting a recumbent tricycle to a land sail vehicle comprising:
   a. a tricycle sprint having a first and second end, said first end of said tricycle sprint allowing for cooperative engagement with the frame of a recumbent tricycle between the second and third wheels of the recumbent tricycle, said second end of said tricycle sprint positioned anteriorly of the second and third wheels of the recumbent tricycle wherein said recumbent tricycle is further comprised of:
      i. a frame having a shape approximating a triangle, having first, second and third vertices;
      ii. a first wheel having a sprocket, said first wheel connected to said frame and positioned at said first vertex of said frame;

iii. a second and third wheel attached to said second and third vertices of said frame, said second wheel and said third wheel opposedly aligned, and wherein said first wheel is centrally positioned behind said second and third wheels;
iv. a seat for supporting a rider, said seat positioned behind said second and third wheels and attached to said frame;
v. a boom extending anteriorly of said second and third wheels;
vi. a chain wheel supportably attached to said boom and positioned anteriorly of said seat, said chain wheel connecting to a set of pedals for input of motive force by said rider to a chain driving said first wheel sprocket;
vii. a braking system acting on said second and third wheels and controllable by said rider;
viii. a steering system acting on said second and third wheels and controllable by said rider;
b. a vertically positioned mast having a first and second end, said first end of said mast engaged with said frame between said second and third wheels;
c. a forestay having a first and second end, said first end of said forestay attached to said second end of said mast and said second end of said forestay attached to said second end of said tricycle sprint;
d. a back stay having a first and second end, said first end of said back stay attached to said second end of said mast and said second end of said back stay attached to said frame, proximate said first vertex of said frame;
e. a starboard mast sidestay having a first and second end, said first end of said starboard mast sidestay attached to said second end of said mast and said second end of said starboard mast sidestay attached to said frame at said second vertex;
f. a port mast sidestay having a first and second end, said first end of said port mast sidestay attached to said second end of said mast and said second end of said port mast sidestay attached to said frame at said third vertex;
g. a starboard sprint sidestay having a first and second end, said first end of said starboard sprint sidestay attached to said second end of said tricycle sprint and said second end of said starboard sprint sidestay attached to said frame proximate said second vertex;
h. a port sprint side stay having a first and second end, said first end of said port sprint side stay attached to said second end of said tricycle sprint and said second end of said port sprint side stay attached to said frame proximate said third vertice;
i. a tricycle sprint bottom stay having a first and second end, said first end of said tricycle sprint bottom stay attached to said second end of said tricycle sprint and said second end of said tricycle sprint bottom stay attached to said frame proximate to said mast interface with said frame;
j. a luff line having a first and second end, said first end of said luff line connected to said second end of said mast and said second end of said luff line connected to a furler positioned at said second end of said tricycle sprint;
k. a butterfly jib boom having a first and second end, said second end of said butterfly jib boom attached to said forestay;
l. a jib sail having a triangular shape and swivelly attached along its first portion by said luff line, said jib sail positioned within said butterfly jib boom, said jib sail adjusted by attachment of said top portion of said jib sail to said mast and wherein said forestay, rear stay, mast sidestays and sprint stays cooperatively support attachment and use of said jib sail to said recumbent tricycle thereby allowing a rider to apply wind force to stably motivate said land vehicle.

61. The combination of cooperating elements offered as a kit according to claim 60 also including a sprint stay spreader with first and second ends positioned transverse of said tricycle sprint and wherein said first end of said sprint stay spreader cooperates with said port sprint sidestay and said second end of said sprint stay spreader cooperates with said starboard sprint sidestay to maintain a pre-determined distance between said port sprint sidestay and said starboard sprint sidestay.

62. The combination of cooperating elements offered as a kit according to claim 61 further comprising:
    a. A back stay having a first and second section wherein said first section of said back stay is a single line having an end which is attached to said second end of said mast and said second section of said back stay is comprised of a first and second line wherein each of said first and second lines has an end for attachment;
    b. A stern stay bar having a first and second opposing ends is mounted to said recumbent tricycle frame in a position posterior of said first wheel and transverse to said first wheel and wherein said stern stay bar has a pre-determined length selected to maintain a pre-determined distance between said first and second lines of said second section of said back stay and wherein the ends of said first and second lines of said second section of said back stay are attached to said first and seconds ends of stern stay bar.

63. The combination of cooperating elements offered as a kit according to claim 62 also including a braking system acting upon said first wheel, independent of said braking system acting upon said second and third wheels.

64. The combination of cooperating elements offered as a kit according to claim 63 also including a set of turnbuckles cooperatively engaged between first and said second ends, respectively, of said forestay, said back stay, said starboard mast sidestay, said port mast sidestay, said starboard sprint sidestay, said port sprint sidestay, and said tricycle sprint bottom stay to allow independent mechanical tension adjustment.

65. The combination of cooperating elements offered as a kit according to claim 64 wherein said tricycle sprint is comprised of a material selected from the group consisting of aluminum, steel, carbon fiber composite, plastic and combinations thereof.

66. The combination of cooperating elements offered as a kit according to claim 65 wherein said forestay is tubular and comprised of a material selected from the group consisting of aluminum, steel, carbon fiber composite, plastic and combinations thereof.

67. The combination of cooperating elements offered as a kit according to claim 66 including a rigid jib spar instead of a luff line, said rigid jib spar having a first and second end wherein said first end of said rigid jib spar is connected to said second end of said mast and said second end of said rigid jib spar is connected to a furler, said rigid jib functioning to increase overall efficiency of said jib sail during operation by maintaining maximum wind exposure through enhanced rigidity of said jib sail.

68. The combination of cooperating elements offered as a kit according to claim 67 wherein said rigid jib spar is comprised of a material selected from the group consisting of aluminum, steel, carbon fiber composite, plastic and combinations thereof.

69. The combination of cooperating elements offered as a kit according to claim 60 also including a braking system acting upon said first wheel of said recumbent tricycle, independent of said braking system of said recumbent tricycle acting upon said second and third wheels of said recumbent tricycle.

70. The combination of cooperating elements offered as a kit according to claim 69 wherein said jib sail is transparent.

71. The combination of cooperating elements offered as a kit according to claim 70 wherein said jib sail has a transparent window.

72. The combination of cooperating elements offered as a kit according to claim 67 wherein said rigid jib spar is comprised of a material selected from the group consisting of aluminum, steel, carbon fiber composite, plastic and combinations thereof.

73. The combination of cooperating elements offered as a kit according to claim 72 wherein said jib sail is transparent.

74. The combination of cooperating elements offered as a kit according to claim 72 wherein said jib sail has a transparent window.

\* \* \* \* \*